United States Patent
Kurmis

(10) Patent No.: US 7,278,188 B2
(45) Date of Patent: Oct. 9, 2007

(54) ARRAY AND METHOD FOR TYING CABLE TREES AND THE LIKE AND METHOD FOR THE PRODUCTION OF STRIPS

(75) Inventor: Viktor Kurmis, Pinneberg (DE)

(73) Assignee: Hellermann Tyton GmbH, Tornesch (DE)

( * ) Notice: Subject to any disclaimer, the term of this patent is extended or adjusted under 35 U.S.C. 154(b) by 0 days.

(21) Appl. No.: 10/257,506

(22) PCT Filed: Feb. 6, 2002

(86) PCT No.: PCT/EP02/01239

§ 371 (c)(1),
(2), (4) Date: Oct. 11, 2002

(87) PCT Pub. No.: WO02/064442

PCT Pub. Date: Aug. 22, 2002

(65) Prior Publication Data

US 2004/0049890 A1    Mar. 18, 2004

(30) Foreign Application Priority Data

Feb. 12, 2001   (EP)  .................. 01103246

(51) Int. Cl.
*B65D 63/14*   (2006.01)

(52) U.S. Cl. ............. 24/16 PB; 24/30.5 P; 140/93.2
(58) Field of Classification Search ............ 24/17 A, 24/30.5 R, 30.5 P, 16 R, 16 PB, 17 AP, DIG. 48; 248/74.3; 292/325; 29/33.5; 140/93 A, 140/93.2, 93.4, 123.6, 123.5; 100/29–33 PB
See application file for complete search history.

(56) References Cited

U.S. PATENT DOCUMENTS

| 3,537,146 | A | * | 11/1970 | Caveney | .............. 24/16 PB |
| 4,683,620 | A | * | 8/1987 | Valsecchi et al. | ......... 24/71 SK |
| 4,908,911 | A | * | 3/1990 | Bretti et al. | .............. 24/16 PB |
| 5,379,494 | A | * | 1/1995 | Shirakawa | .............. 24/16 PB |
| 6,070,304 | A | * | 6/2000 | Lii | .............. 24/16 PB |
| 6,149,109 | A | * | 11/2000 | Stankowski | .............. 248/74.3 |

FOREIGN PATENT DOCUMENTS

| FR | 2054432 | * | 4/1971 |
| GB | 2065218 A | * | 6/1981 |

* cited by examiner

*Primary Examiner*—James R Brittain

(74) *Attorney, Agent, or Firm*—Alix, Yale & Ristas, LLP

(57) ABSTRACT

Tying arrangement comprising a strip, which is serrated at least on one side, and a lock, which is intended for receiving two ends of a portion of the strip and contains at least one blocking device, which is serrated in such a way as to match the serration of the strip. In order to preserve the tips of the teeth, the teeth tips of the teeth provided on the blocking device and the teeth bases of the strip are rounded off or beveled at least on their sides lying against one another in the tightened state. Such an arrangement is used in tying methods in which the free strip end is led back into the lock after wrapping around the item to be tied.

17 Claims, 2 Drawing Sheets

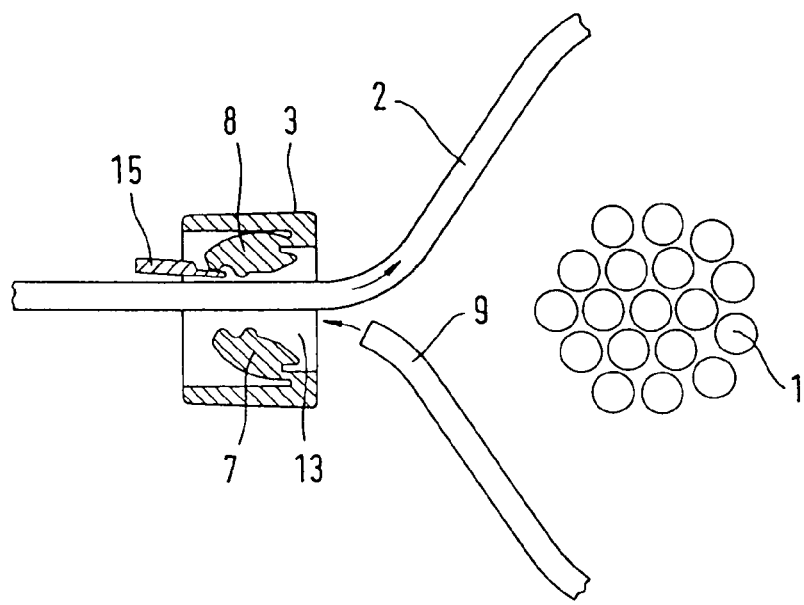
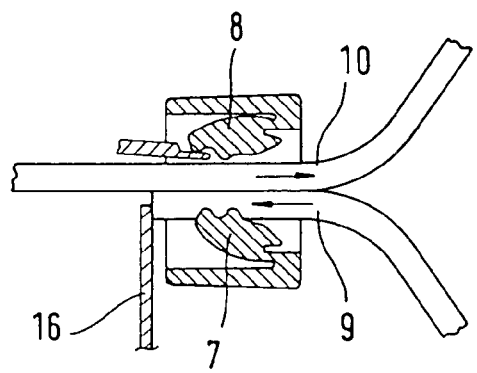
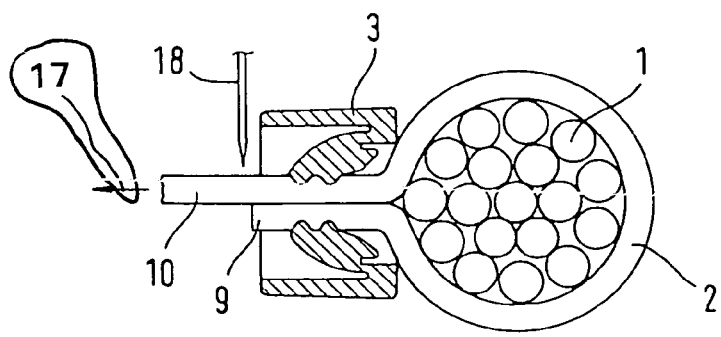

ARRAY AND METHOD FOR TYING CABLE TREES AND THE LIKE AND METHOD FOR THE PRODUCTION OF STRIPS

CROSS-REFERENCE TO RELATED APPLICATIONS

This is the national stage of International Application No. PCT/EP02/01239, filed Feb. 6, 2002 and which designated the United States.

BACKGROUND OF THE INVENTION

Strips for tying cable harnesses and other items are known, said strips being used in the form of portions of a long supply of strip. Both ends of a strip loop wrapped around the item to be tied and tightened are secured by means of a lock. Provided within the lock are two serrated blocking devices, which act together in a blocking manner with a serration of a respective end of the strip loop (U.S. Pat. No. 4,680,834, GB-A 2055218, EP-A-488 051, EP-B-297 337).

At the beginning of the tying operation by means of a tool, a portion of the strip is pushed forward through a lock, its teeth being kept away from the oppositely directed teeth of the blocking devices. The strip is passed around the item in the form of a loop, the length of which is greater than the circumference of the item to be tied. Its leading, free end is then led back into the lock and secured there by means of one of the blocking devices, while the other end of the strip, joined to the supply of strip, is pulled back for the purpose of tightening. As this happens, its teeth slide along the teeth of the other blocking device, which may cause them to damage one another. The smaller the circumference of the items to be tied in comparison with the length of the loop initially formed, the greater the distance over which the end of the strip has to be pulled back during tightening. If items of a very small circumference are to be tied, it may happen that several teeth of the strip run past the teeth of the locks during a number of successive tightening operations and, as a result, are repeatedly stressed and possibly damaged before they are finally themselves used for the blocking function in a later tying operation. The instances of damage may then have the effect of reducing the blocking force. The teeth of the lock may also be damaged in the process. The probability of damage is all the greater the sharper the edges of the teeth in the locks. This sharpness of the edges has previously being considered to be necessary in order for the teeth of the lock to engage reliably in the teeth of the strip. This is even the case if the tips of the teeth of the strip are rounded off (U.S. Pat. No. 4,680,834, GB-A 2065218). Therefore, they are kept apart from one another during this operation. This must take place with a certain safety margin.

Apart from the reliability of the blocking engagement, there is a further reason why the teeth tips of known blocking devices are formed with sharp edges. This is that it is endeavored to make the engagement of the teeth of the blocking device into the teeth of the strip take place as close as possible to the tooth base, that is to say at the connection of the tooth to the continuous strand cross section of the strip, because otherwise there is the risk of the tooth of the strip bending and the tooth of the lock sliding off it.

SUMMARY OF THE INVENTION

It is an object of the invention to reduce the required safety margin or clearance required between the teeth of the lock and the teeth of the strip during installation of the strip.

It is also an object of the invention to avoid the reduction in blocking force brought about as a result of rounding the teeth.

Accordingly, the teeth tips of the blocking device and the teeth bases of the strip are rounded off or beveled at least on their sides lying against one another in the tightened state. This achieves the effect that the teeth tips both of the strip and of the lock are damaged less easily. Furthermore, it achieves the effect that the safety margin which has to be maintained when the strip is pushed forward between the teeth of the strip and the blocking teeth can be reduced. This is so because it is not absolutely necessary for contact to be avoided if the teeth slide past one another more easily thanks to the rounding. This applies in particular whenever, according to a further feature of the invention, the tips of the teeth on the strip are also rounded off or beveled. In this case, the bases of the teeth on the blocking device are also rounded off or beveled. The rounding-off or beveling expediently relates to both sides of the teeth tips and teeth bases of the strip, in particular symmetrically.

The rounding-off of the tips of the teeth on the blocking device has the consequence that the force transfer between the blocking device of the lock and the teeth of the strip does not take place directly at the transition from the teeth of the strip to the continuous strand cross section, but at a certain distance from it. Contrary to previous opinion, however, this does not constitute a disadvantage. On the contrary, the rounding-off of the tooth base avoids the teeth of the strip being over stressed by a notch effect at this point. This applies in particular if the tooth profile of the strip is produced by embossing a strand of hot-plastic polymer. This is so because particularly strong flowing of the strip material then takes place in the region of the surface of the tooth base, whereby the elongate molecules or the reinforcing fibers possibly contained in the material are structured parallel to the surface of the tooth base. As a result, a significant increase in strength with respect to the forces occurring at this point is achieved.

Furthermore, it has been found that the stressing of the teeth when they slide through the lock leads less readily to damage, and that the risk of the teeth deforming under the blocking force also occurs less readily if the flank angle of the teeth (i.e. the angle between a flank and a line taken perpendicular to the direction of the strip) is chosen to be relatively large, that is over 25 degrees. Furthermore, it may be expedient to restrict the rounding-off or beveling to no more than approximately one quarter of the overall height of the teeth of the strip, it expediently extending over no more than 0.1 mm (measured in the direction of the strip height). It is, however, also normally intended to take up not less than one eighth of the tooth height.

The arrangement described has proven successful in particular in those tying methods in which the strip is initially passed through the lock in a pushing-forward direction counter to the blocking devices, the free end of the loop formed thereby is wrapped around the item, led back into the lock and the other end of the loop, which is joined to the supply of strip, is led back counter to the pushing-forward direction. In the case of such an arrangement, the end joined to the supply of strip has to move counter to the blocking devices assigned to it not only when the free end of the strip is located outside the lock and is moving around the item to be tied but also when the free end of the strip is being led back into the lock, and therefore the space in the lock between the mutually opposite blocking devices is confined. Although the blocking device directed counter to the pushing forward of the strip is still forcibly kept away from the teeth of the strip in this phase, if the rounding-off or beveling of the teeth tips according to the invention has the effect that the movement is not stopped when there is inadvertently slight contact of the teeth with the blocking devices, no great safety margin need be maintained between the teeth of the strip and the blocking devices. The lock can correspondingly be given smaller dimensions. This increases the reliability and reduces the necessary dimensions of the lock, and consequently also the material requirement.

BRIEF DESCRIPTION OF THE DRAWINGS

The invention is explained in more detail below with reference to the drawings, which illustrates advantageous exemplary embodiments and in which:

FIGS. 2 to 4 show the tying arrangement in different functional stages in a less magnified enlargement and FIGS. 5 and 6 show details of a rounded-off tooth shape and a beveled tooth shape.

DETAILED DESCRIPTION OF THE PREFERRED EMBODIMENT

Figure 1:
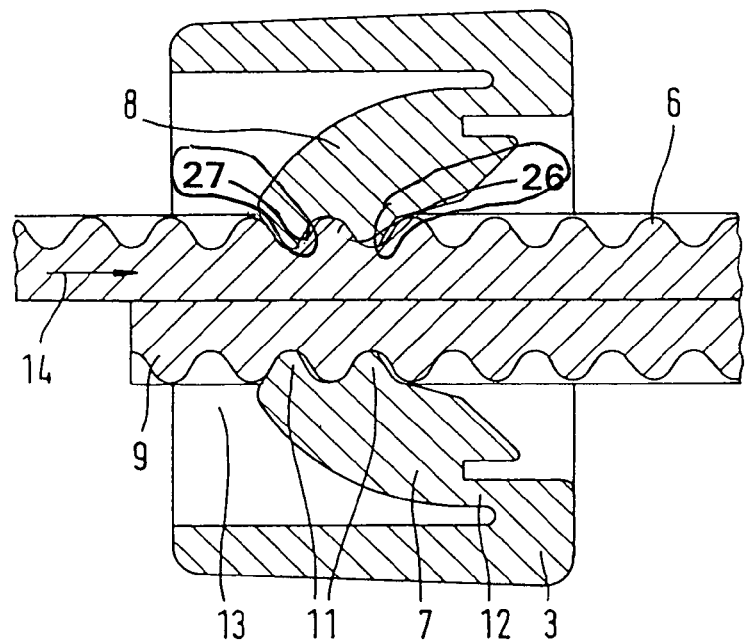
FIG. 1 shows a greatly enlarged cross sectional representation of the tying arrangement comprising a strip and lock.

An item, for example a bundle of cables 1, is to be tied by means of the strip 2 and lock 3 in the way shown in FIG. 4 (shortly before completion of the tying operation). For this purpose, a tool of the type shown in EP-A-297 337 is used. The strip 2 has teeth 6 on one side. The lock 3 contains blocking devices, which are formed by a first blocking pawl 7, which acts together with the free end 9 of the strip 2, and a second blocking pawl 8, which acts together with the end 10 of the strip 2, on which the pushing-forward members within a tying device act and which is joined to a supply of strip (not shown). For this purpose, the blocking pawls 7, 8 have teeth 11, the shape of which is made to match that of the teeth 6 of the strip. They protrude obliquely from a point of articulation 12 into the opening 13 located in the lock in such a way that they hinder the strip end 9, 10 respectively acting together with them from moving in the direction of the arrow 14. Although the teeth of the blocking pawls are referred to in the plural, because usually at least two teeth are arranged on each blocking pawl, the scope of protection is also intended to cover the case in which only one tooth is provided on a blocking pawl.

The tying operation is performed as follows. Firstly, according to FIG. 2, the strip 2 is pushed in the direction 14 through the lock 3, which is held in the tool, and wrapped by means of guiding devices (not represented) around the item 1 to be tied, so that the leading, free strip end 9 appears again in front of the lock 3. In order that the teeth of the strip end 10 passed through the lock are not arrested by the teeth of the associated blocking pawl 8, the latter is hindered from protruding into the range of movement of the strip end 10 by means of a tongue 15 which is provided in the tool. The tongue 15 also forms a guiding face for the serrated surface of the strip 10. For this purpose, it is at least as close to the strip end 10 as the teeth of the second blocking pawl 8. As a result, the strand 10 of the strip is safely taken past the teeth of the second blocking pawl 8. It cannot collide with the teeth of the first pawl 7, because it is underrated on that side. If, as an exception, it should happen to be serrated on this side, the first blocking pawl 7 may similarly be provided with a tongue 15 restraining it, in the same way as in the case of the second blocking pawl 8.

During the passing of the loop formed from the strip 2 around the item 1 to be tied, the length of the strip loop is greater, in many cases even many times greater, than the circumference of the item 1 to be tied. When at the end of the wrapping-around operation the leading strip end 9 reaches the lock 3 again (FIG. 2), according to FIG. 3 it enters the opening of the lock 3 on the side of the first blocking pawl 7, until it meets a resistance or sensor 16, which ends the further pushing forward of the strip If the guiding device which passes the strip around the item to be tied has a constant length during this operation, as is generally the case, the pushing of the strip end 9 into the lock 3 takes place on the basis of the pushing-forward movement which is imparted to the strip part 10 of the strip in the tool. This means that this strip part 10 must move through the lock 3 in the direction 14 counter to the second blocking pawl 8 and counter to the direction of movement of the free strip end 9. This is possible because, even when the free strip end 9 has entered the lock, the second locking pawl 8 acting together with the strip part 10 is hindered from engaging in the serration of the strip part 10 by the tongue 15.

If, in the case of another embodiment of the invention, the movement of the free strip end 9 into the lock 3 is not brought about by pushing forward of the strip part 10, but for example by shortening the circumference of the loop passed around the item, the strip part 10 can remain stationary as this happens, the second blocking pawl 8 may then engage in the serration of the strip part 10.

As soon as the free strip end 9 has penetrated into the lock 3 and been secured by the first blocking pawl 7, the other end 10 of the strip loop is pulled back in the direction of arrow 17 according to FIG. 4. As a result, the loop is tightened around the item 1 to be tied. As soon as the desired strip tightening is achieved, the strip end 10 joined until then to the supply of strip is cut off by a blade 18.

Figure 5:
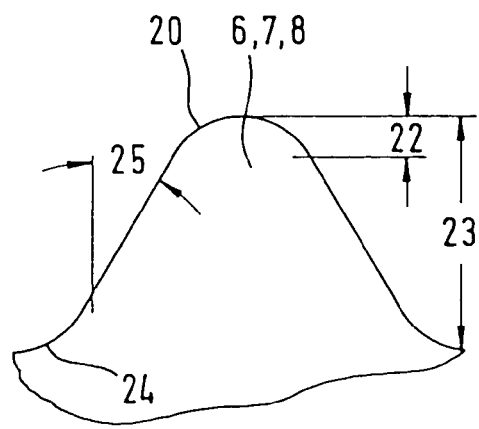
Figure 6:
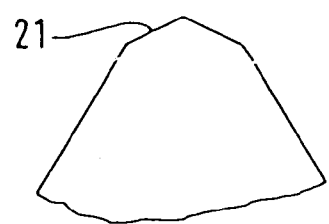

During the tightening of the strip, a large part of the loop of the strip 2 wrapped around the item 1 at a considerable distance from it is pulled back through the lock 3. If the circumference of the item 1 is many times smaller than the circumference of the loop initially formed, it happens that certain portions of strip are repeatedly pushed forward through a lock and pulled back again through the same lock for tightening in successive tying operations, before they themselves act together in a locking manner with a blocking pawl 7, 8. It is therefore important that they remain undamaged up to the time they reach their final locking state. The teeth tips of the blocking pawls are also to remain undamaged. This is more difficult to achieve with previously known teeth tips of the blocking pawls formed with points or edges than with the less sensitive teeth which, according to FIG. 5, are rounded off or, according to FIG. 6, are beveled. The rounding-off 20 or beveling 21 extends only over the uppermost part 22 of the height of the tooth tip, it being intended for this part to be as small as possible with a view to the function of said rounding-off or beveling. This is generally no greater than approximately one quarter of the tooth height 23 and/or than 0.1 mm. On the other hand, the rounding-off is also not to take up less than approximately one eight of the tooth height. Preferably, both the engaged and unengaged surfaces 26, 27 of the tooth are rounded-off or beveled, providing a symmetrical cross section. Alternatively, only the engaged surfaces of the tooth may be rounded-off or beveled.

The rounding-off of the tips of the teeth on the blocking device has the consequence that the force transfer between the blocking device of the lock and the teeth of the strip does not take place directly at the transition from the teeth of the strip to the continuous strand cross section, but at a certain distance from it. Contrary to previous opinion, however, this does not constitute a disadvantage. On the contrary, the rounding-off of the tooth base avoids the teeth of the strip being over stressed by a notch effect at this point. This applies in particular if the tooth profile of the strip is produced by embossing a strand of hot-plastic polymer. This is so because particularly strong flowing of the strip material then takes place in the region of the surface of the tooth base, whereby the elongate molecules or the reinforcing fibers possibly contained in the material are structured parallel to the surface of the tooth base. As a result, a significant increase in strength with respect to the forces occurring at this point is achieved.

This applies correspondingly to the teeth bases 24 of the strip. Such rounding-off or beveling effects may also be provided at the teeth bases of the blocking pawls 7, 8. However, while the rounding-off or beveling at the teeth bases of the strip is expediently restricted to the extent predetermined by the rounded or beveled profile of the teeth tips of the blocking pawls, the clearance at the base of the blocking pawl teeth can be dimensioned more generously.

With regard to the resistance of the teeth, the flank angle 25 is chosen to be relatively large, that is in the present example around 30°. It goes without saying that the angle of engagement of the blocking pawls 7, 8 (the angle between the direction of the strip and the line which joins the joint of the blocking pawl to the point of engagement on the strip) must always be greater than the flank angle.

The invention claimed is:

1. A strap for tying elongate objects having a predetermined maximum circumference, the strap comprising:
    a strip having a length greater than the maximum circumference of the objects, a trailing end portion, a leading end portion having a length at least equal to the maximum circumference of the objects, oppositely disposed first and second sides, and a plurality of teeth on the first side defining a single row of teeth, each tooth of the plurality of teeth having a base, a tip and first and second surfaces extending from the base to the tip, the first surface being rounded off or beveled at the base; and
    a lock defining a longitudinally extending cavity adapted for receiving the strip and defining a first direction and an opposite second direction, the lock including first and second blocking devices for engaging the teeth on the strip, each blocking device having at least one tooth having a base, a tip and first and second surfaces extending from the base to the tip, the first surface being rounded off or beveled at the tip;
    wherein the leading end portion of the strip is advanced in the first direction through the lock cavity, wrapped around the objects, and advanced in the second direction through the lock cavity, whereby the teeth of the first blocking device engage the first surface of the teeth of the strip and the teeth of the second blocking device engage the second surface of the teeth of the strip to block further movement of the strip within the lock in the first direction; and
    wherein the strip is tensioned around the object by retracting the trailing end portion of the strip through the lock cavity in the second direction.

2. The tying arrangement as claimed in claim 1, wherein the teeth tips of the strip are also rounded off or beveled.

3. The tying arrangement as claimed in claim 1, wherein the second surfaces of the teeth tips of each blocking device and the second surfaces of the teeth bases of the strip are rounded off or beveled.

4. The tying arrangement as claimed in claim 3, wherein the teeth of the strip are symmetrically formed in cross section.

5. The tying arrangement as claimed in claim 1, wherein each tooth has a height and the first surface of the tooth has a height which is no greater than one quarter of the height of the tooth.

6. The tying arrangement as claimed in claim 5, wherein the height of the first surface of the tooth is no greater than 0.1 mm.

7. The tying arrangement as claimed in claim 6, wherein the height of the first surface is no smaller than one eighth of the height of the tooth.

8. The tying arrangement as claimed in claim 1, wherein the first surface of each tooth defines a flank angle of at least 25°.

9. The tying arrangement as claimed in claim 1, wherein the strip is a strand of hot-plastic polymer having an embossed tooth profile.

10. The tying arrangement as claimed in claim 1, wherein the teeth tips of the strip and the teeth bases of each blocking device are also rounded off or beveled.

11. The tying arrangement as claimed in claim 1, wherein the first and second surfaces of the strip teeth have a straight contour between the tip and the rounded off or beveled base.

12. The tying arrangement as claimed in claim 8, wherein the first and second surfaces of the strip teeth have a straight contour between the tip and the rounded off or beveled base.

13. The tying arrangement as claimed in claim 1, wherein the lock also includes a tongue positionable for preventing engagement between the teeth of a one of the blocking devices and the teeth of the strip.

14. A method of tying elongate objects with a strap, the objects having a predetermined maximum circumference, the strap including a strip and a lock, the strip having a length greater than the maximum circumference of the objects, a trailing end portion, a leading end portion having a length at least equal to the maximum circumference of the objects, oppositely disposed first and second sides, and a plurality of teeth on the first side defining a single row of teeth, each tooth of the plurality of teeth having a base, a tip and first and second surfaces extending from the base to the tip, the first surface being rounded off or beveled at the base, the lock defining a longitudinally extending cavity defining a first direction and an opposite second direction and including a first blocking device adapted to engage the first surface of the teeth on the strip and a second blocking device adapted to engage the second surface of the teeth on the strip, each blocking device having at least one tooth having a base, a tip and first and second surfaces extending from the base to the tip, the first surface being rounded off or beveled at the tip, the method comprising the steps of:
    advancing the leading end portion of the strip in the first direction through the lock cavity;
    wrapping the leading end portion of the strip around the objects;
    advancing the leading end portion of the strip in the second direction through the lock cavity, whereby the teeth of the first and second blocking devices engage the teeth of the strip to block further advancement of the leading end portion of the strip in the first direction; and tensioning the strip around the object by advancing the trailing end portion of the strip in the second direction.

15. A strap for tying elongate objects having a predetermined maximum circumference, the strap comprising:

a strip having a length greater than the maximum circumference of the objects, a trailing end portion, a leading end portion having a length at least equal to the maximum circumference of the objects, oppositely disposed first and second sides, and a plurality of teeth on the first side, each tooth of the plurality of teeth having a base, a tip and first and second surfaces extending from the base to the tip, the first surface having a flank portion extending from the base and a bevel portion extending at an obtuse angle from the flank portion; and a lock defining a longitudinally extending cavity adapted for receiving the strip and defining a first direction and an opposite second direction, the lock including first and second blocking devices for engaging the teeth on the strip, each blocking device having at least one tooth having a base, a tip and first and second surfaces extending from the base to the tip, the first surface having a flank portion extending from the base and a bevel portion extending at an obtuse angle from the flank portion;

wherein the leading end portion of the strip is advanced in the first direction through the lock cavity, wrapped around the objects, and advanced in the second direction through the lock cavity, whereby the teeth of the first and second blocking devices engage the teeth of the strip to block further movement of the strip within the lock in the first direction; and wherein the strip is tensioned around the object by retracting the trailing end portion of the strip through the lock cavity in the second direction.

16. A strap for tying elongate objects having a predetermined maximum circumference, the system comprising:

a supply of strip having a length greater than the maximum circumference of the objects, oppositely disposed leading end and trailing end portions, oppositely disposed first and second sides, and a plurality of teeth on the first side defining a single row of teeth, the leading end portion having a length at least equal to the maximum circumference of the objects, each tooth of the plurality of teeth having a base, a tip and first and second surfaces extending from the base to the tip, the first surface being rounded off or beveled at the base;

a lock defining a longitudinally extending cavity adapted for receiving the supply of strip and defining a first direction and an opposite second direction, the lock including first and second blocking devices for engaging the teeth on the supply of strip, each blocking device having at least one tooth having a base, a tip and first and second surfaces extending from the base to the tip, the first surface being rounded off or beveled at the tip;

wherein the leading end portion of the supply of strip is advanced in the first direction through the lock cavity, wrapped around the objects, and advanced in the second direction through the lock cavity, whereby a strip loop is formed with the teeth of the first blocking device engaging the first surface of the teeth of the strip and the teeth of the second blocking device engaging the second surface of the teeth of the supply of strip to block further movement of the supply of strip within the lock in the first direction; and wherein the strip loop is tensioned around the object by retracting the trailing end portion of the supply of strip through the lock cavity in the second direction and the strip loop is separated from the supply of strip, defining a new leading end portion of the supply of strip.

17. A method of tying elongate objects with a strap, the objects having a predetermined maximum circumference, the strap including a supply of strip and a lock, the supply of strip having a length greater than the maximum circumference of the objects, oppositely disposed leading end and trailing end portions, oppositely disposed first and second sides, and a plurality of teeth on the first side defining a single row of teeth, the leading end portion having a length at least equal to the maximum circumference of the objects, each tooth of the plurality of teeth having a base, a tip and first and second surfaces extending from the base to the tip, the first surface being rounded off or beveled at the base, the lock defining a longitudinally extending cavity defining a first direction and an opposite second direction and including a first blocking device adapted to engage the first surface of the teeth on the strip and a second blocking device adapted to engage the second surface of the teeth on the strip, each blocking device having at least one tooth having a base, a tip and first and second surfaces extending from the base to the tip, the first surface being rounded off or beveled at the tip, the method comprising the steps of:

advancing the leading end portion of the supply of strip in the first direction through the lock cavity;

wrapping the leading end portion of the supply of strip around the objects;

advancing the leading end portion of the supply of strip in the second direction through the lock cavity, whereby a strip loop is formed with the teeth of the first and second blocking devices engaging the teeth of the supply of strip to block further movement of the supply of strip within the lock in the first direction;

tensioning the strip loop around the object by retracting the trailing end portion of the supply of strip through the lock cavity in the second direction; and separating the strip loop from the supply of strip, defining a new leading end portion of the supply of strip.

* * * * *